SIGNAL PROCESSING MEANS

Filed July 10, 1961 3 Sheets-Sheet 1

CHARLES H. COLEMAN, JR.
RICHARD W. PALTHE
INVENTORS

BY Nathan N. Kallman

ATTORNEY

CHARLES H. COLEMAN, JR.
RICHARD W. PALTHE
INVENTORS

BY Nathan N. Kallman

ATTORNEY

CHARLES H. COLEMAN, JR.
RICHARD W. PALTHE
INVENTORS

BY Nathan N. Kallman

ATTORNEY

United States Patent Office 3,263,222
Patented July 26, 1966

3,263,222
SIGNAL PROCESSING MEANS

Charles H. Coleman, Jr., Belmont, and Richard W. Palthe, San Carlos, Calif., assignors to Ampex Corporation, Redwood City, Calif., a corporation of California Filed July 10, 1961, Ser. No. 122,960
9 Claims. (Cl. 340—174.1)

This invention relates to a means for processing an electrical signal, and in particular to an improved means for varying the frequency of a signal.

In may electronic systems that are associated with electromechanical apparatus, it is necessary to provide timing stability and synchronization for the signal being processed. In magnetic tape apparatus for processing wideband signals, which utilizes a rotary head drum carrying a plurality of magnetic heads for example, the mechanical elements for driving the magnetic medium or tape and the rotary heads should bear the same precise relation in phase and frequency during playback as existed during the record mode. Any spurious differential that may arise in such relationship results in timing instability and loss of synchronization of the reproduced signal, and must necessarily be compensated for by time adjustment means.

To this end, a first degree of synchronizing control is usually provided by the registration of a longitudinal control track along one edge of the magnetic tape, in a well-known manner. An additional degree of time base control may be obtained by the use of a synchronizing system, hereinafter referred to as the "Intersync" synchronizer, described in U.S. Patent 3,017,462 and assigned to the same assignee. In this "Intersync" synchronizer, a synchronizing signal having a plurality of components, such as the horizontal and vertical hynchronizing pulses of a standard television signal, is provided. A first synchronizing component is used to provide a relatively coarse adjustment of the rotational velocity of the rotary head scanning means to synchronize the presentation of information from the tape with another source of signal information. A second synchronizing component which has a substantially greater frequency than that of the first component is used to provide a relatively fine adjustment of the angular velocity of the scanning means.

However, when recording and reproducing wideband information signals that are continuous and which do not include periodic synchronizing pulses, such as found in a standard television signal, additional means are necesesary to provide improved time stability to that no substantial undesirable transients appear in the reproduced signal.

In a magnetic tape apparatus, such as defined in U.S. Patent 3,188,615, issued June 8, 1965, in the name of D. Wilcox, Jr., and assigned to the same assignee, a carrier signal is employed that is frequency modulated by an information signal and added with a pilot signal during recording. The pilot signal thus experiences the same timing errors as the frequency modulated (FM) information signal during recording and playback, and therefore these timing errors that appear in the pilot signal may be utilized to provide compensation in order that the recorded signal may be faithfully reproduced. Therefore, it would be desirable to employ the pilot signal for obtaining synchronizing information, and thereby subsequent adjustment by means of the "Intersync" synchronizer of the phase of the FM signal being reproduced, which contains the same timing errors as the pilot signal. However, in order to achieve this adjustment, the pilot signal must be transformed to a frequency that closely relates to that of a reference synchronizing signal utilized by the synchronizer for purposes of comparison and development of an error voltage representing the erratic timing displacement of the pilot signal. This error voltage may then be used for instantaneous adjustment of the mechanical driving elements.

For the purpose of convenience of explanation, it is assumed hereafter that the pilot signal is 500 kilocycles per second whereas the reference synchronizing signal supplied by the "Intersync" synchronizer for fine phase adjustment is 15,625 cycles per second, by way of example. It is understood that other frequency values for the pilot and reference signals are contemplated as within the scope of this invention.

An object of this invention is to provide an improved signal processing means.

Another object of this invention is to provide a gating circuit that produces relatively sharp pulses of a predetermined frequency containing the same timing information that is found in a related waveform signal having a different frequency.

In accordance with this invention, a timing waveform signal having a relatively high frequency is changed into a series of unipolar sharp pulses that are applied to an "AND" gate. Concurrently, a synchronizing pulse waveform signal having a relatively lower frequency is processed to provide a short pulse of the same polarity as the high frequency pulses and of a duration equivalent to that of a very small number of such high frequency pulses. The relatively low frequency and high frequency pulse signals are applied concurrently to the gate that passes the very small number of high frequency pulses, which contain timing or phase information characteristics of the timing signal. The first pulse of the gate output is employed to trigger a one-short multivibrator to provide a synchronizing pulse having a predetermined frequency and duration similar to that of a standard reference pulse supplied by a synchronizing system for the purpose of comparison. The developed synchronizing pulse and the reference pulse are phase compared to generate an error voltage that may be employed for phase compensation, such as the adjustment of the angular phase of a rotary head assembly in a magnetic tape apparatus.

In a particular embodiment of this invention, a square wave pilot signal of relatively high frequency that has been derived from a frequency standard and recorded on a magnetic tape additively with a frequency modulated information signal is derived from the tape for application to the circuit of this invention. The pilot signal, which has the same timing or phase errors as the recorded information signal, is fed to a blocking oscillator or multiar that provides a sharp pulse output having positive spikes coincident with the positive going leading edge of the square wave. After clipping the negative spikes, the remaining sharp positive pulses are applied to one end of an "AND" gate.

At the same time, a square wave pulse signal of relatively low frequency derived from the frequency standard is employed as a synchronizing pulse signal. The square wave pulse signal is modified to provide a signal having a relatively short duration encompassing a small number of the sharp pulses provided by the blocking oscillator to the gate. The modified pulse having the same polarity as the clipped pilot pulse signal is applied to another end of the gate to open the gate and pass a small number of sharp pulses representing the square wave pilot signal. The first of these sharp pulses, which is coincident with the positive going leading edge of the square wave pilot signal, triggers a one-shot multivibrator to generate a synchronizing pulse having a predetermined duration related to the time constant of the multivibrator circuit. This generated synchronizing pulse has a frequency and a duration similar to a reference synchronizing signal employed in a synchronizer for a magnetic tape apparatus and may, therefore, be used for phase comparison to develop a phase error voltage. In turn, the error voltage may be utilized for instantaneous adjustments and control of the angular velocities of the rotating elements of the magnetic tape apparatus. In this manner, proper synchronization may be achieved in a magnetic tape apparatus with improved and precise time stability so that a recorded signal is faithfully reproduced.

The invention will be described in greater detail with reference to the drawings in which.

Figure 1:
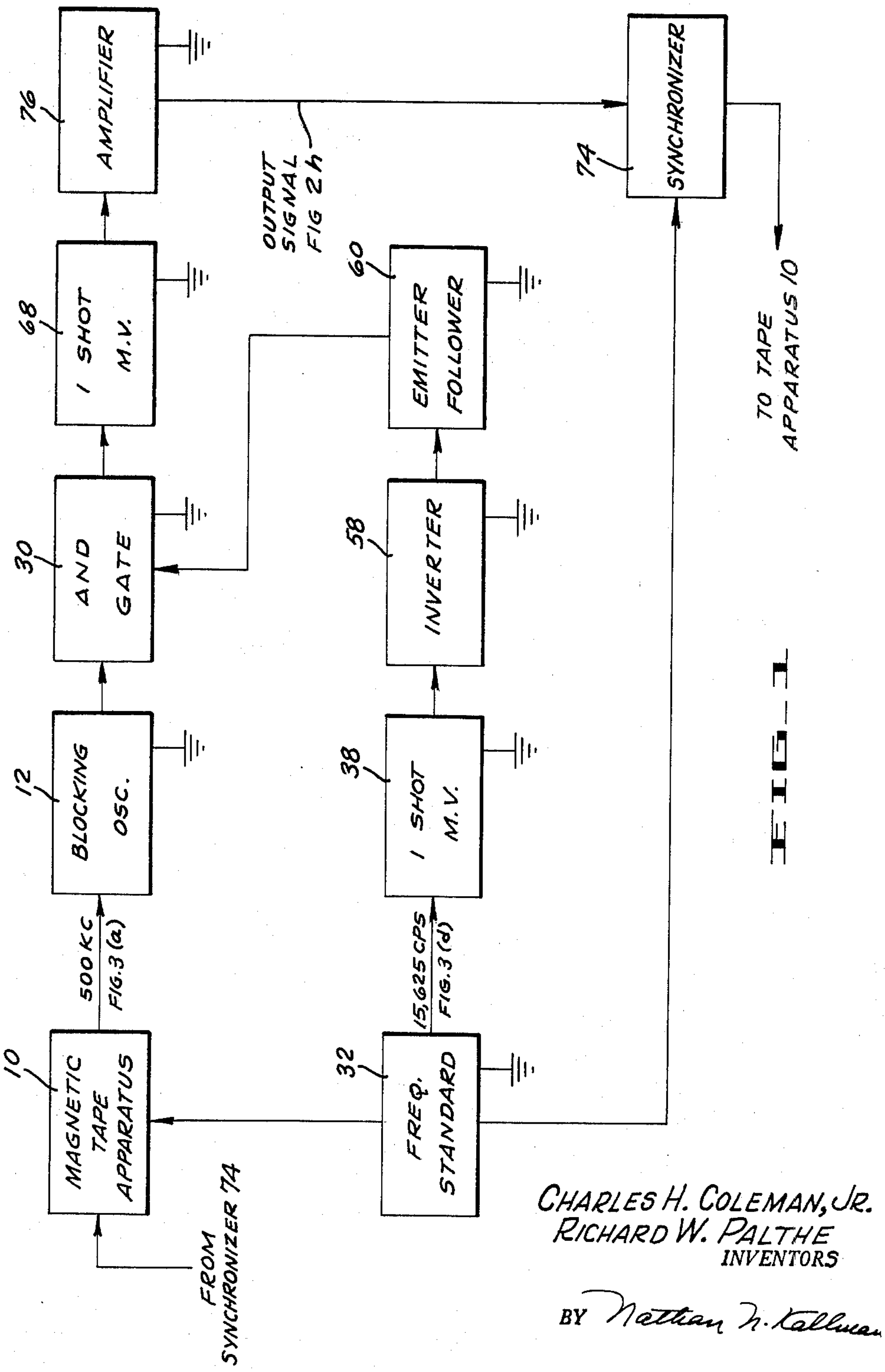
FIGURE 1 is a block diagram illustrating the invention.

FIGURES 3*a–h* is a series of waveforms applicable to the circuit represented in FIGURE 1.

Figure 2:
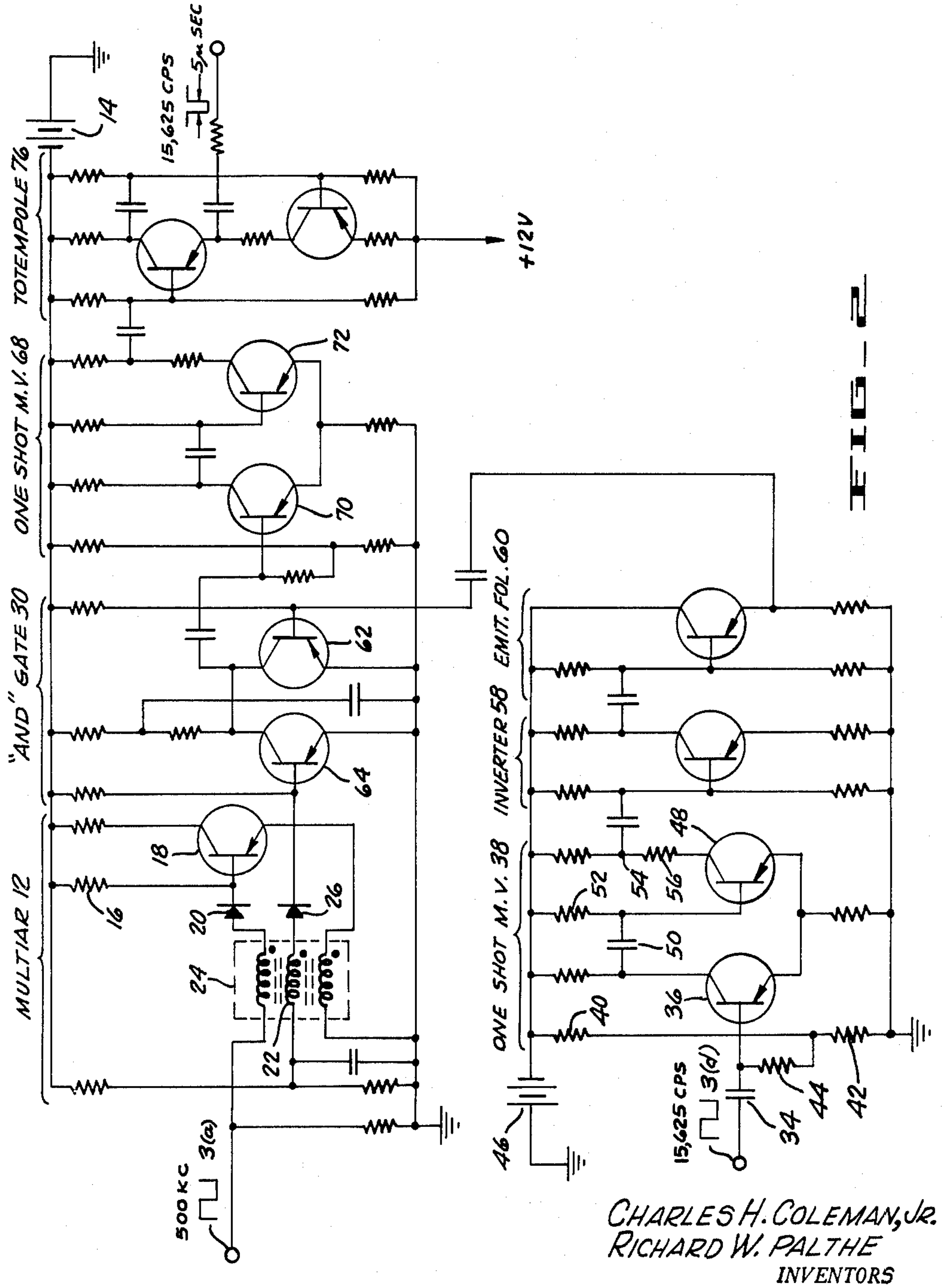
FIGURE 2 is a schematic circuit of the same invention.
Figure 3:
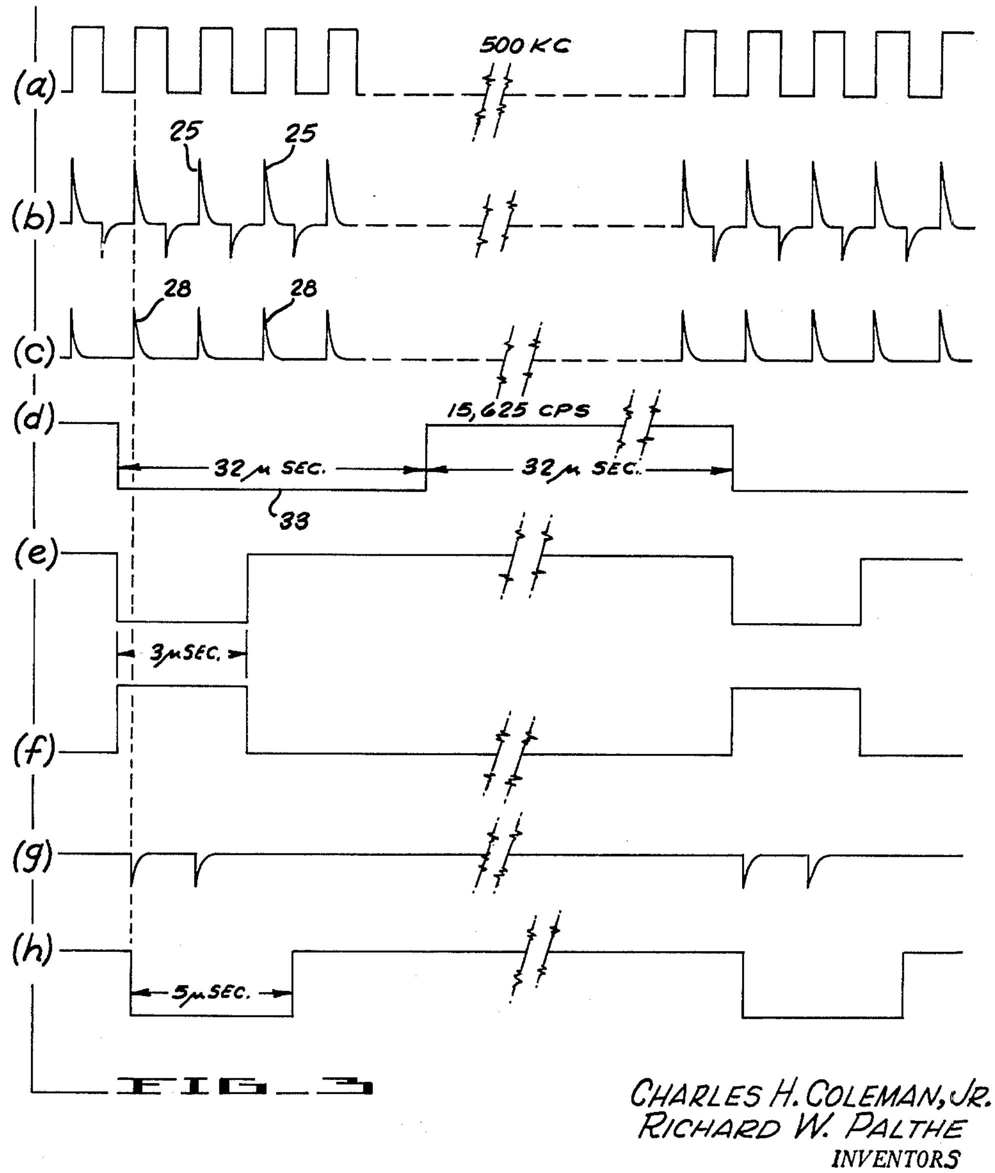

In FIGURES 1 and 2, an input signal such as a 500 kilocycle square wave pilot signal (FIGURE 3*a*) is derived from a recorded tape in a magnetic tape apparatus 10 and applied to a blocking oscillator stage 12. The blocking oscillator 12 may be of the "multiar" type such as described in "Pulse and Digital Circuits," Millman and Taub, page 480, published by McGraw-Hill Book Company, Inc., 1956. When the input voltage exceeds the bias voltage that is derived from a power supply 14 through a resistor 16 that is coupled to the base of the blocking oscillator transistor 18, a diode 20 connected in the base circuit of the transistor 18 becomes forward biased and causes the transistor 18 to conduct. A regenerative cycle begins whereby the blocking oscillator 12 produces a series of alternate positive and negative pulses, such as shown in FIGURE 3*b*. These pulses, which appear in the tertiary winding 22 of a transformer 24 coupled to the blocking oscillator 12, are clipped by a diode 26 so that only the positive pulses 28 appear at the next stage, which is an "AND" gate 30. It is noted that the sharp positive pulses 28 are coincident with the positive going leading edges of the square wave pilot signal (FIGURE 3*a*), and in effect represent the phase and timing information that is found in the pilot signal.

Concurrently, a 15,625 cycle square wave having a pulse width of about 32 microseconds, such as illustrated in FIGURE 3*d*, is derived from a frequency standard 32 and applied through a differentiating capacitor 34 to the base of a transistor 36 in a one-shot multivibrator stage 38. Resistors 40, 42 and 44 coupled between a power supply 46 and the transistor 36 serve to provide a bias voltage to the base of the transistor 36.

The one-shot multivibrator 38 comprises a pair of transistors 36 and 48, the transistor 48 being normally conducting whereas the transistor 36 is normally cut off. However, when a negative pulse from the differentiator 36, 42, 44 corresponding to the leading edge of the pulse of FIGURE 3*d* is applied to the base of the transistor 36, the transistor begins to conduct and the collector voltage tends to approach zero. The varying collector voltage of the transistor 36 is applied to the base of the transistor 48 through a coupling capacitor 50, and when this voltage becomes sufficiently positive, the transistor 48 is cut off. Since the transistors 36 and 48 have a common emitter coupling, any change in conduction of the transistor 48 affects the conduction of the transistor 36. The length of time that the transistor 48 remains cut off is determined essentially by the RC time constant of the capacitor 50 and a resistor 52. When the base of the transistor 48 becomes sufficiently negative, the transistor 48 will conduct again. The multivibrator output appears at a junction 54, coupled to the collector of the transistor 48 by a load resistor 56, as a square wave output (FIGURE 3*e*) having, in the present example, a pulse width of about 3 microseconds. The time constant of the multivibrator 38 is set so that a predetermined small number of sharp pulses (FIGURE 3*c*) may be passed by the "AND" gate 30 when the outputs from the blocking oscillator 12 and the multivibrator 38 are concurrently applied to the gate 30. The 3 microsecond pulse (FIGURE 3*e*) from the multivibrator 38 is then reversed in polarity by an inverter 58 (as in FIGURE 3*f*) and applied through an emitter follower 60 to the base of the transistor 62 of the "AND" gate 30. The "AND" gate 30 is opened upon coincident application of the sharp positive pulses (FIGURE 3*c*) to a transistor 64 and the positive square wave pulse (FIGURE 3*f*) to the transistor 62 so that a very small number of sharp pulses (FIGURE 3*g*) coincident with the pulses of FIGURE 3*c* are passed to the output. The first of these sharp negative pulses (FIGURE 3*g*) fires a one-shot multivibrator 68, comprising a pair of emitter coupled transistors 70 and 72, that has a time constant for developing a square wave pulse having a duration of about five microseconds (FIGURE 3*h*). The five microsecond pulse, which has the same duration as a reference signal employed in the "Intersync" synchronizer 74 mentioned above for the purpose of phase comparison, is directed through a totem pole amplifier stage 76 that has negative feedback for providing a low impedance coupling with the "Intersync" synchronizer 74.

There has been described a transistorized gating circuit that serves to transform a waveform signal of relatively high frequency having timing or phase information to a pulse signal of relatively low frequency having the same timing or phase information.

What is claimed is:

1. A gating circuit comprising: means for changing a timing waveform signal of a first frequency having timing information to a series of sharp unipolar pulses, said unipolar pulses having said timing information; means for applying said unipolar pulses to an "AND" gate; means for applying a synchronizing pulse signal of a second frequency lower than the first frequency and having a pulse duration that encompasses a number of said unipolar pulses to said "AND" gate, whereby the coincidence of said applied synchronizing and unipolar pulse signals opens the gate; and means for developing a synchronizing signal of predetermined pulse duration having said timing information and of the same frequency as said applied synchronizing pulse signal in response to the output from said gate whereby said developed synchronizing pulse signal having such timing information may be employed for synchronization.

2. A gating circuit comprising: means for changing a timing waveform signal of a first frequency having timing information to a series of sharp pulses; means for clipping said pulses so that the clipped pulse signal is unipolar, said unipolar pulses having said timing information; means for applying said unipolar pulse signal to an "AND" gate; means for applying a synchronizing pulse signal of a second frequency lower than the first frequency and having a pulse duration that encompasses a number of said unipolar pulses to said "AND" gate whereby the coincidence of said applied synchronizing and unipolar pulse signals opens the gate; and means for developing a synchronizing signal of predetermined pulse duration having said timing information and of the same frequency as said applied synchronizing pulse signal in response to the output from said gate whereby said developed synchronizing pulse signal having such timing information may be employed for synchronization.

3. A gating circuit comprising: a blocking oscillator for changing a timing waveform signal of a first frequency having timing information to a series of sharp pulses, said pulses having said timing information; an "AND" gate for receiving said series of sharp pulses; means for applying a synchronizing pulse signal of a second frequency lower than the first frequency and having a pulse duration that encompasses a number of said sharp pulses to said "AND" gate for opening the gate; and means for developing a synchronizing pulse signal of predetermined pulse duration having said timing information and of the same frequency as said applied synchronizing pulse signal in response to the output from said gate whereby said developed synchronizing pulse signal having such timing information may be employed for synchronization.

4. A transistorized gating circuit for developing a synchronizing pulse signal of a predetermined frequency and pulse width having timing information related to timing information contained in a timing waveform signal of a frequency greater than the predetermined frequency comprising: means for deriving such timing waveform signal; a blocking oscillator circuit for transforming said waveform signal to a series of sharp pulses containing such timing information; means for deriving a synchronizing pulse signal having a first frequency; means for establishing a predetermined width for said synchronizing pulse signal, said pulse width being greater than a number of said sharp pulses developed by said oscillator circuit; means for applying said series of sharp pulses and said synchronizing pulse signal of predetermined pulse width in the same polarity to an "AND" gate for passing said number of sharp pulses; and means for triggering a multivibrator in response to the first of said number of pulses for developing a synchronizing pulse signal having a desired pulse duration and of said first frequency and with substantially the same timing information as contained in said timing waveform signal.

5. A transistorized gating circuit for developing a synchronizing pulse signal of a predetermined frequency and pulse width having timing information related to timing information contained in a timing waveform signal of a frequency greater than the predetermined frequency comprising: means for deriving such timing waveform signal; a multiar stage for transforming said waveform signal to a series of sharp pulses containing such timing information; means for deriving a pulse signal having a first frequency; multivibrator means for establishing a pulse width of short duration for said pulse signal having a first frequency, said pulse width being greater than a member of said sharp pulses developed by said multiar circuit; means for applying said series of sharp pulses and said pulse signal having a first frequency in the same polarity to an "AND" gate for passing said number of sharp pulses; and a multivibrator responsive to the first of said number of sharp pulses for developing a synchronizing pulse signal having a desired pulse duration and such first frequency and with substantially the same timing information as contained in said timing waveform signal.

6. In combination with a magnetic tape apparatus wherein a frequency modulated information signal is recorded additively with a pilot signal, both signals having the same timing information: means for deriving the pilot signal from the recorded magnetic tape; means for transforming said pilot signal to unipolar sharp pulses having the same timing information as the recorded signal; means for supplying a pulse signal having a lower frequency than said pilot signal; gating means coupled to said pilot signal transforming means and said pulse signal supplying means for passing a number of said sharp pulses; and means for developing a synchronizing pulse of predetermined duration in response to one of said number of sharp pulses.

7. In a combination with a magnetic tape apparatus wherein a frequency modulated information signal is recorded additively with a pilot signal, both signals having the same timing information: means for deriving the pilot signal from the recorded magnetic tape; means for transforming said pilot signal to sharp pulses having the same timing information as the recorded signal; means for supplying a pulse signal having a lower frequency than said pilot signal; gating means coupled to said pilot signal transforming means and said lower frequency pulse signal supplying means for passing a number of such sharp pulses; and means for developing a synchronizing pulse signal of predetermined duration in response to the first of said number of sharp pulses, said developed synchronizing pulse signal having the same timing information as the sharp pulses and the recorded signal.

8. In combination with a magnetic tape apparatus wherein a frequency modulated information signal is recorded additively with a pilot signal, both signals having the same timing information: means for deriving the pilot signal from the recorded magnetic tape; a blocking oscillator for transforming the pilot signal to a series of unipolar sharp pulses having the same timing information as the recorded signal; an "AND" gate for receiving such unipolar sharp pulses; a frequency standard for providing a pulse signal of lower frequency than the pilot signal; a one-shot multivibrator for developing a pulse signal of short duration in response to said pulse signal of lower frequency; an inverter for changing the polarity of said pulse signal of short duration to the same polarity as that of the sharp pulses; means for applying said inverted pulse signal of short duration to the "AND" gate; a one-shot multivibrator coupled to the output of said "AND" gate for generating a synchronizing pulse signal of predetermined duration in response to the first sharp pulse received from said "AND" gate; and means for applying said generated synchronizing pulse of predetermined duration to a synchronizer for phase comparison and subsequent phase compensation in the magnetic tape apparatus.

9. In a recording and reproducing system wherein a frequency modulated information signal is recorded on a storage medium additively with a pilot signal having a higher frequency than the information signal, both signals having the same timing information when recorded, a combination comprising: means for deriving the pilot signal from the storage medium; means for transforming said pilot signal to unipolar sharp pulses having the same timing information as the recorded signal; means for supplying a synchronizing pulse signal having a first frequency; means for reducing the pulse duration of said pulse signal, said reduced duration being equal to the occurrence of a number of the unipolar sharp pulses; gating means coupled to said pilot signal transforming means and said synchronizing pulse signal width reducing means for passing said number of pulses; and means for developing a synchronizing pulse of predetermined duration in response to one of said number of pulses.

References Cited by the Examiner

UNITED STATES PATENTS

| | | | |
|---|---|---|---|
| 2,614,218 | 10/1952 | Hancock | 328—61 |
| 2,668,283 | 2/1954 | Mullin | 340—174.1 |

BERNARD KONICK, *Primary Examiner.*

IRVING L. SRAGOW, *Examiner.*

F. C. WEISS, T. W. FEARS, *Assistant Examiners.*